United States Patent [19]
Grover

[11] Patent Number: 5,933,602
[45] Date of Patent: Aug. 3, 1999

[54] SYSTEM FOR SELECTING COMMAND PACKET AND CORRESPONDING RESPONSE PACKET FROM COMMUNICATION STREAM OF PACKETS BY MONITORING PACKETS SENT BETWEEN NODES ON NETWORK

[75] Inventor: Douglas M. Grover, Elk Ridge, Utah

[73] Assignee: Novell, Inc., Provo, Utah

[21] Appl. No.: 08/690,142

[22] Filed: Jul. 31, 1996

[51] Int. Cl.⁶ .................................................. G06F 13/00
[52] U.S. Cl. ...................................................... 395/200.54
[58] Field of Search ....................... 395/200.54, 200.55, 395/200.61, 200.62, 200.63–67, 200.56–59; 370/241

[56] References Cited

U.S. PATENT DOCUMENTS

| | | | |
|---|---|---|---|
| 5,197,127 | 3/1993 | Waclawsky et al. | 395/200 |
| 5,247,517 | 9/1993 | Ross et al. | 370/85.5 |
| 5,343,465 | 8/1994 | Khalil | 370/17 |
| 5,351,243 | 9/1994 | Kalkunte et al. | 370/92 |
| 5,365,514 | 11/1994 | Hershey et al. | 370/17 |
| 5,375,070 | 12/1994 | Hershey et al. | 364/550 |
| 5,477,531 | 12/1995 | McKee et al. | 370/17 |
| 5,572,674 | 11/1996 | Ernst | 395/200.1 |
| 5,648,965 | 7/1997 | Thadani et al. | 370/241 |
| 5,684,945 | 11/1997 | Chen et al. | 395/182.18 |

OTHER PUBLICATIONS

Enger and Reynolds, RFC 1470, http://ftp.cised.unina.it/pub/docs/rfc–unsorted/rfc 1470.txt, pp. 65, 70, 93, 95, 102, 103, 128, 135, 146 and 160, Jun. 1993.

Novell NetWare, Network Computing Products, LANalyzer for Windows 2.1 User's Guide, Chapter 5, pp. 75–103, Mar. 1994.

Network General, Expert Sniffer Network Analyzer Operations Release 4.5, pp. 1–3 through 1–7, 7–3 through 7–26, 6–62 through 6–75, Jan., 1995.

Primary Examiner—Moustafa M. Meky
Attorney, Agent, or Firm—Dinsmore & Shohl LLP

[57] ABSTRACT

A method and apparatus for selecting and displaying command and response packets of interest communicated over a network utilizing a command and response protocol. The method and apparatus of the invention enable the quick determination of problems which can occur when utilizing a command and response protocol.

20 Claims, 13 Drawing Sheets

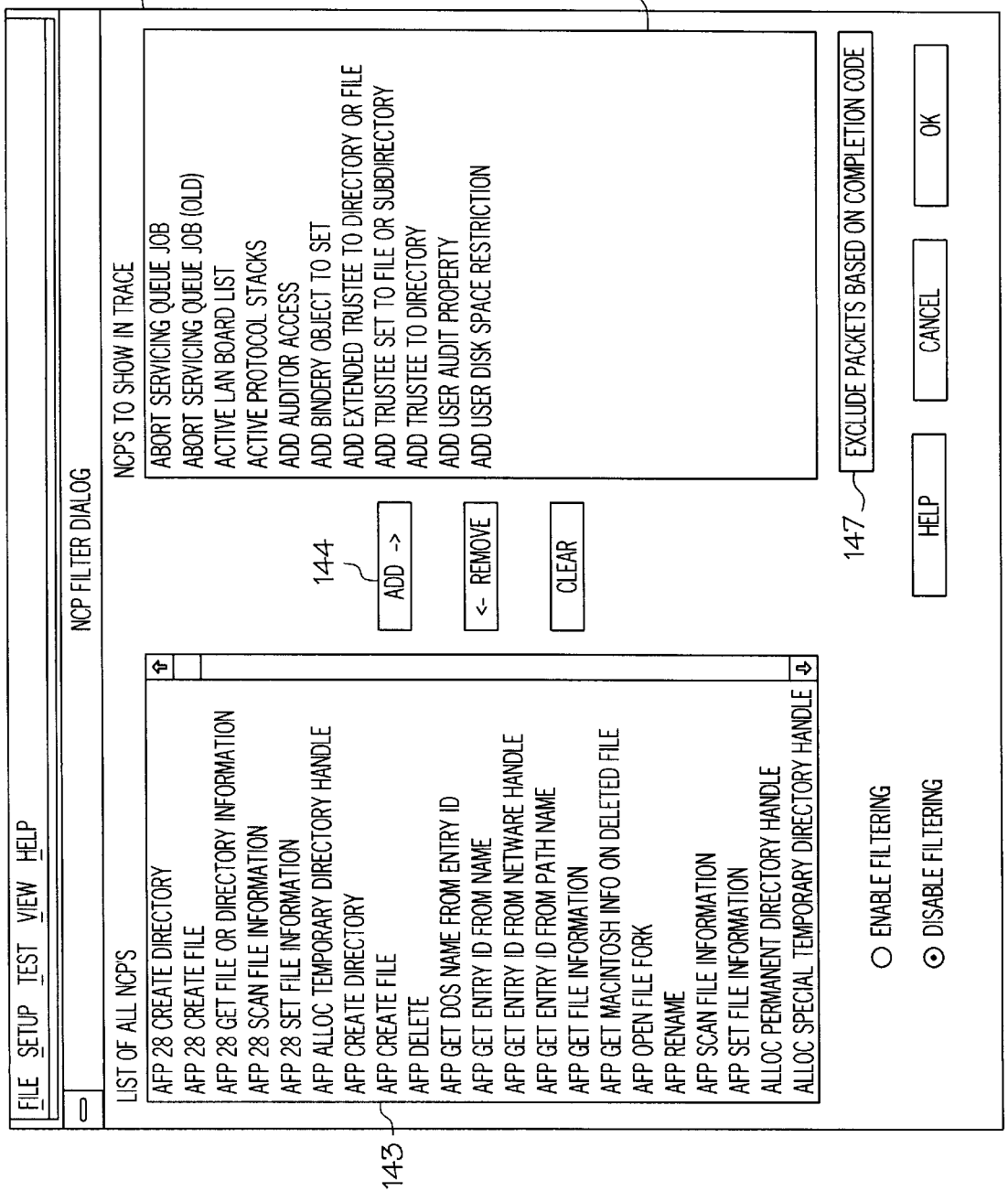

SYSTEM FOR SELECTING COMMAND PACKET AND CORRESPONDING RESPONSE PACKET FROM COMMUNICATION STREAM OF PACKETS BY MONITORING PACKETS SENT BETWEEN NODES ON NETWORK

TECHNICAL FIELD

The present invention relates generally to monitoring packet traffic on a communications channel and selecting packets based upon predetermined characteristics, and is particularly directed to analyzing packets and dynamically selecting pairs of command and response packets communicated between two nodes coupled to the communications channel. The invention isolates command and response packets from the many other disparate types of packets communicated on a communications channel and greatly reduces the amount of time it takes to debug communications between nodes which are utilizing a command and response packet protocol.

BACKGROUND OF THE INVENTION

Nodes coupled to a communications channel, such as a local area network, communicate with each other by transmitting packets of information over the network. A node transmitting a packet is generally referred to as the source node, and a node receiving the packet is generally referred to as the destination node. A packet includes one or more header portions and a data portion. The header portion includes information such as the source (origination) node of the packet and the destination node of the packet, and the data portion includes whatever data the source node wishes to communicate to the destination node. Certain fields within a packet are used for routing and other packet transmission information by the hardware and various layers of software responsible for transferring the packet from the source node to the destination node. Other fields are used by the destination node to determine what action should be taken.

If a source node either improperly generates a packet structure, or inserts an erroneous value into a properly formatted packet, the resulting packet may not be properly processed by the destination node. When a packet is not processed properly, the developer of the software or hardware responsible for creating the packet must determine what caused the problem. On an active network, the various nodes coupled to the network may be communicating tens of thousands of packets each minute. Thus, determining the cause of the problem can be quite difficult because only one of a large number of packets transmitted over the network may shed light on the nature of the problem.

Software and/or apparatus exist which monitor a communications channel and capture packets transmitted over the channel for statistical and data analysis of the packets. Such programs and apparatus, referred to in general as network analyzers, typically allow for the capture of all packets communicated over a network during a certain time frame, or permit rudimentary selection criteria for selection of only certain packets based upon values of data within the header portion or the data portion of the packets. A network analyzer can interpret the fields of a packet and display the interpreted packet information on a screen, or store the packets in a file for subsequent analysis. Network analyzers are frequently used to determine the source of packet transmission problems occurring on a network. While selecting only those packets meeting certain criteria can greatly reduce the number of packets captured by the network analyzer, and thus eliminate irrelevant packets, determination of the appropriate selection criteria generally requires some knowledge as to the source of the problem. In some instances, the developer knows only that a node communicating packets over the network is either generating packets with an invalid structure, or generating packets with invalid values, but does not know what fields or values are improper. The developer must therefore capture all packets communicated over the network over a predetermined period of time and then painstakingly analyze all the captured packets in an attempt to locate what may be a single improperly generated packet.

Certain types of traffic communicated over a network can be categorized as command and response traffic. A command and response protocol is typically utilized in an environment in which a source node coupled to a network issues a command packet over the network requesting a service of a destination node coupled to the network. The service requested can be data, or the storage of data, or an acknowledgment, or the initiation of a certain activity, for example. The destination node analyzes the command and either provides the service and communicates a response packet indicating such, or communicates a response packet indicating an error. The error could be due to an improperly formatted command packet, or because a value within a properly formatted command packet is erroneous, or because the command cannot be carried out for a particular reason. The source and destination nodes must comply with the predetermined protocol for sending command and response packets, or communication problems will occur. Command and response protocols are utilized at various levels with the Open Systems Interconnect (OSI) model. Relatively well-known command and response protocols which execute at various OSI levels include the Simple Network Management Protocol (SNMP), Netware Core Protocol (NCP), Sequence Packet Exchange (SPX), Transmission Control Protocol (TCP), and High-Level Data Link Control (HDLC).

Developers of software which utilize a command and response protocol frequently must determine why error response packets are being generated in response to certain command packets. One way to determine this is to capture the command packet and the corresponding response packet as they are transmitted over the network. The developer can then analyze the packets and determine how the command and response packets were formatted, and why an error occurred. However, this can be difficult because only two of the thousands of packets that may be communicated over a network in a short period of time may be relevant to the problem. The developer may have to analyze many unrelated packets before the relevant command and response packets are located. Although network analyzer tools such as the Novell LANalyzer® product and the Network General Sniffer™ product can allow for capturing packets which contain a certain value, it is believed that none of the existing network analyzer tools have the capability to selectively extract from a communication stream of packets only command and corresponding response packets. A tool which can extract only command and corresponding response packets would greatly ease the development of software and hardware which utilizes a command and response protocol.

SUMMARY OF THE INVENTION

It is one object of this invention to provide a method and apparatus for monitoring a communication stream of packets on a network and identifying and selecting corresponding command and response packets communicated between first and second nodes coupled to the network.

It is another object of this invention to provide a method and apparatus which identifies a command and a corresponding response packet communicated between nodes coupled to a network and which preserves the command and response packet as a function of a predetermined characteristic of the response packet.

It is yet another object of this invention to provide a method and apparatus which identifies a command and corresponding response packet communicated between nodes coupled to a network and which preserves only those command and response packets in which the response packet contains a completion code indicative of an error.

It is still another object of this invention to provide a method and apparatus for displaying a response packet and corresponding command packet from a previously captured collection of packets communicated over a network.

It is still another object of this invention to provide a method and apparatus for preordering a previously captured collection of packets which had been communicated over a network into a chronological collection of command and response packets, and displaying the command and response packets upon request.

It is yet another object of this invention to provide a method and apparatus which can identify and report out-of-sequence or missing command and response packets from a previously captured collection of command and response packets.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects in accordance with the purposes of the present invention as described above, a method and apparatus is provided for selecting command and corresponding response packets communicated between two nodes coupled to a network from a stream of packets communicated over the network. According to one preferred embodiment of this invention, a first and second node between which command and response packets will be communicated are selected, and the stream of packets communicated over the network is monitored. A command packet sent from the first node is dynamically recognized while the communication stream is being monitored, and is temporarily saved. It is dynamically determined if a response packet sent from the second node is in response to the command packet from the first node, and if so, both the command packet from the first node and the response packet from the second node are preserved. The method and apparatus according to this invention can obtain a user selected value, or a plurality of user selected values, and compare a field within the response packet to the user selected value and preserve the command and corresponding response packet only upon determining that the field within the response packet matches the user selected value. This enables a developer utilizing a command and response protocol to select only a subset of all command and response packets communicated over the network.

According to one preferred embodiment of this invention, the method and apparatus according to this invention extract a first identifier from the command packet and compare the first identifier to a second identifier extracted from a response packet, and determine that the response packet was sent in response to the command packet if the first identifier matches the second identifier.

According to yet another preferred embodiment of this invention, the communication stream of packets on the network is monitored and a command packet communicated by the first node to the second node is preserved only upon receiving and determining that the response packet sent in response to the command packet contains an error code. The method and apparatus according to this invention can quickly identify improperly formatted command packets or command packets having improper values communicated from a node on a network, and can greatly accelerate the development of software or hardware utilizing a command and response protocol. The method and apparatus according to this invention eliminate the need for a developer of software utilizing such a command and response protocol from examining large quantities of unrelated packets that were transmitted over the network almost simultaneously with the command and response packets of interest.

The method and apparatus according to this invention can begin the selection of command and corresponding response packets upon the occurrence of a certain event on the network. Thus, the method and apparatus of this invention can further reduce the number of packets selected to further minimize a developers time in determining the basis of a problem with command and response packets.

The method and apparatus according to one preferred embodiment of this invention can select command and response packets from a previously stored collection or list of packets. The method and apparatus of this invention obtains a first predetermined characteristic of a command packet to select, such as a particular type of command packet, locates a packet in the list of packets, determines if the packet is either a command packet or a response packet, and if a command packet is located, determines if the command packet has the first predetermined characteristic and if so selects the command packet. If a response packet is located, the command packet associated with the response packet is located, and it is determined if the command packet corresponding to the response packet has the first predetermined characteristic and if so the response packet is selected. The method and apparatus according to this invention can also extract and preorder command and response packets from a collection of preselected packets.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

Figure 1:
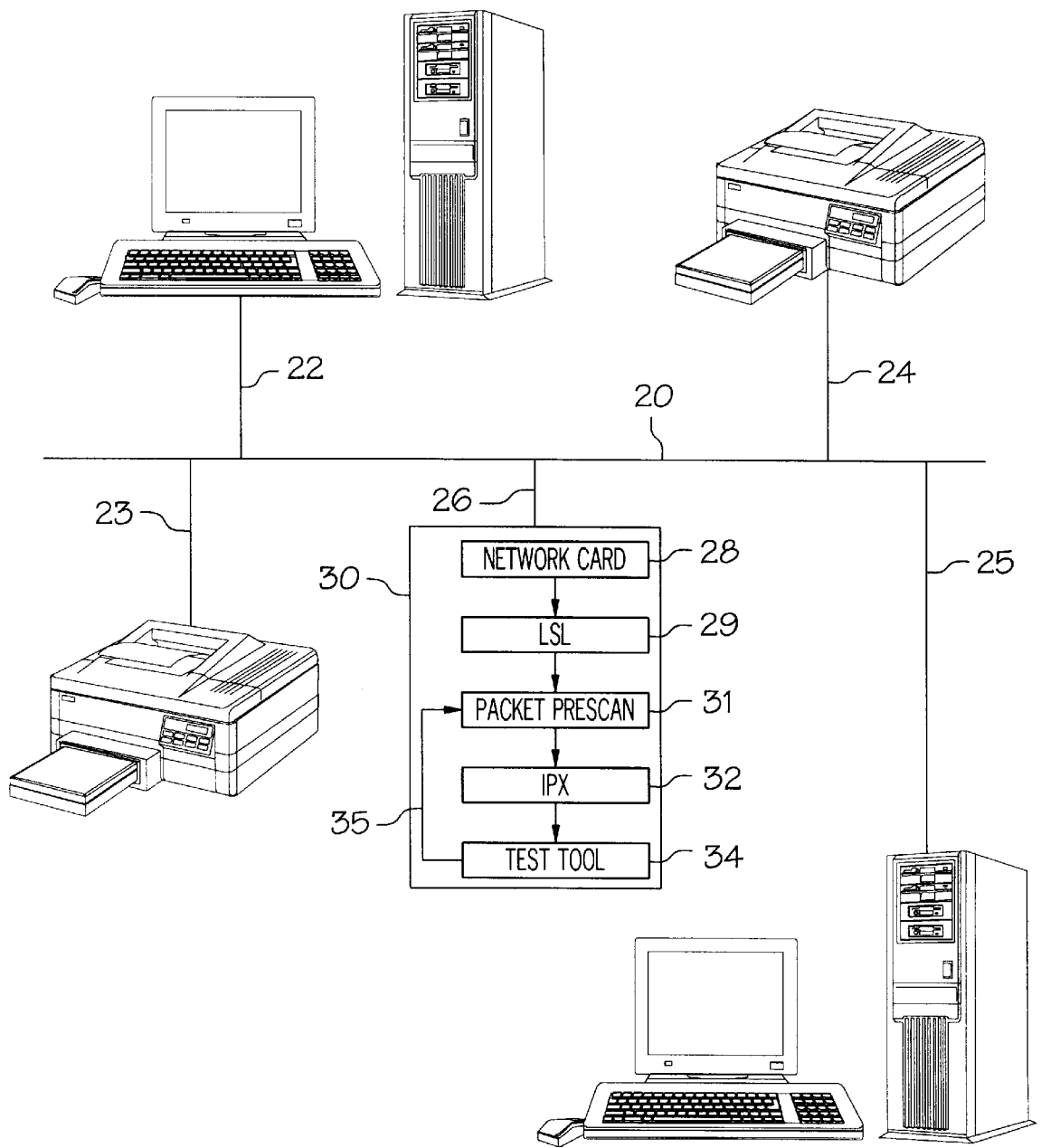
FIG. 1 is a diagram of the method and apparatus for selecting command and response packets from a communication stream of packets on a network, according to one preferred embodiment of this invention.

Throughout the specification and claims, use of the phrase predetermined characteristic refers to an attribute of a packet such as a particular value within a field of the packet, or the length of the packet, for example. Referring now to the drawings, FIG. 1 shows a diagram of nodes 22–25 coupled to network 20. Network 20 can comprise a local area network, a wide area network, or any other suitable communications channel over which a command and response protocol can be utilized. The method and apparatus according to one preferred embodiment of this invention execute on workstation 30, which is coupled to network 20 at node 26. Node 24 communicates a command packet over network 20 and requests a service from node 25. Although node 24 is represented as an intelligent printer having the capability to generate, transmit and receive packets over a network, it is apparent that node 24 can comprise any network-attachable device having such capability. Node 25 analyzes the command packet and in response to the command packet communicates a response packet over network 20 to node 24. During the same time frame, nodes 22 and 23 communicate packets over network 20 to each other or to nodes 24 and 25. As is apparent, on an actual network there may be hundreds of nodes communicating tens of thousands of packets per minute. Thus, over any given time frame, a plurality of packets including command and response packets as well as a variety of other types of packets can be communicated consecutively over network 20.

Workstation 30 includes network card 28 which handles transmitting and receiving packets over network 20. Network card 28 can comprise any standard communications card capable of transmitting and receiving packets over a communications channel. The method and apparatus according to this invention can be initiated by executing test tool 34 on work station 30. Test tool 34 can initiate packet prescan 31. Test tool 34 can execute under any conventional operating system, although it preferably executes on an operating system which supports a graphical user interface such as the Microsoft Windows™ operating system. Packet prescan 31 can scan packets received by network card 28 and quickly eliminate further processing of any packets which are not command or response packets, or which are packets communicated between nodes other than nodes 24 and 25. In the Windows operating system, packet prescan 31 may be a Terminate and Stay Resident (TSR) process. Test tool 34 can initiate packet prescan 31 via the DOS Protected Mode Interface (DPMI), for example. It is apparent that the method and apparatus according to this invention could also be implemented in appropriate circuitry rather than execute on a general purpose microprocessor in order to ensure capture of all packets on high speed communication channels.

Packet prescan 31 puts network card 28 into promiscuous mode so that packet prescan 31 will be passed each packet communicated on network 20 rather than only those packets having a destination address of workstation 30. Thus, packet prescan 31 will receive each packet communicated over network 20 and can analyze each packet to determine if it is a command and a response packet and should be farther analyzed, or if it should be discarded. Upon determining that a packet is a command or a response packet, packet prescan 31 can determine if the source and destination addresses in the header portion of the particular packet match one of the addresses of preselected nodes 24 and 25. If the source address and destination address of the packet matches the addresses of preselected nodes 24 and 25, packet prescan 31 can make the appropriate modifications to the packet to pass the packet to test tool 34, such as modifying the socket number in the packet header to match the socket of test tool 34, and can then place the packet on the resubmit queue so the packet will ultimately be communicated to Internetwork Packet Exchange (IPX) layer 32 and from there to test tool 34 for further analysis of the packet. The modifications which must be made to allow transfer of the packet to test tool 34 are documented in the appropriate documentation relating to the specific network architecture over which test tool 34 is executing. For example, if the network architecture utilized is IPX, the appropriate modifications are documented in the Novell Open Data Link Interface (ODI) Specification document available from Novell, Inc. of Provo, Utah. In this manner, only command and response packets of interest are received by test tool 34. Although workstation 30 is illustrated using the IPX network layer protocol, it is apparent that the method and apparatus of this invention can be utilized with any network transport protocol, including for example, TCP/IP.

Test tool 34 can determine whether the packet is a command or a response packet and can pair a command packet with its corresponding response packet by extracting from each packet an identifier, and ensuring that the identifier from the command packet matches the identifier from the response packet. The use of an identifier, sometimes referred to as a sequence number, to uniquely identify a pair of command and response packets is common to most command and response protocols, including SNMP and NCP.

Thus, the method and apparatus according to this invention can quickly isolate from what may be a large number of packets communicated over network 20 in a short period of time only those packets which are command and response packets, and can pair a command packet with its corresponding response packet. This invention eliminates the need for a developer of software or hardware utilizing a command and response protocol from analyzing possibly tens of thousands of packets to locate the pair of command and response packets of interest. Thus, the method and apparatus according to this invention enable the rapid development of software and hardware utilizing a command and response protocol.

Although the method and apparatus according to one preferred embodiment of this invention are implemented in a dual process mode including packet prescan 31 and test tool 34, it will be apparent to those skilled in the art that the method and apparatus according to this invention could be carried out in a single process, with test tool 34 performing the selection processing carried out by packet prescan 31, or could be implemented in a combination of firmware/software to enhance the speed by which the packets are processed.

Figure 2:
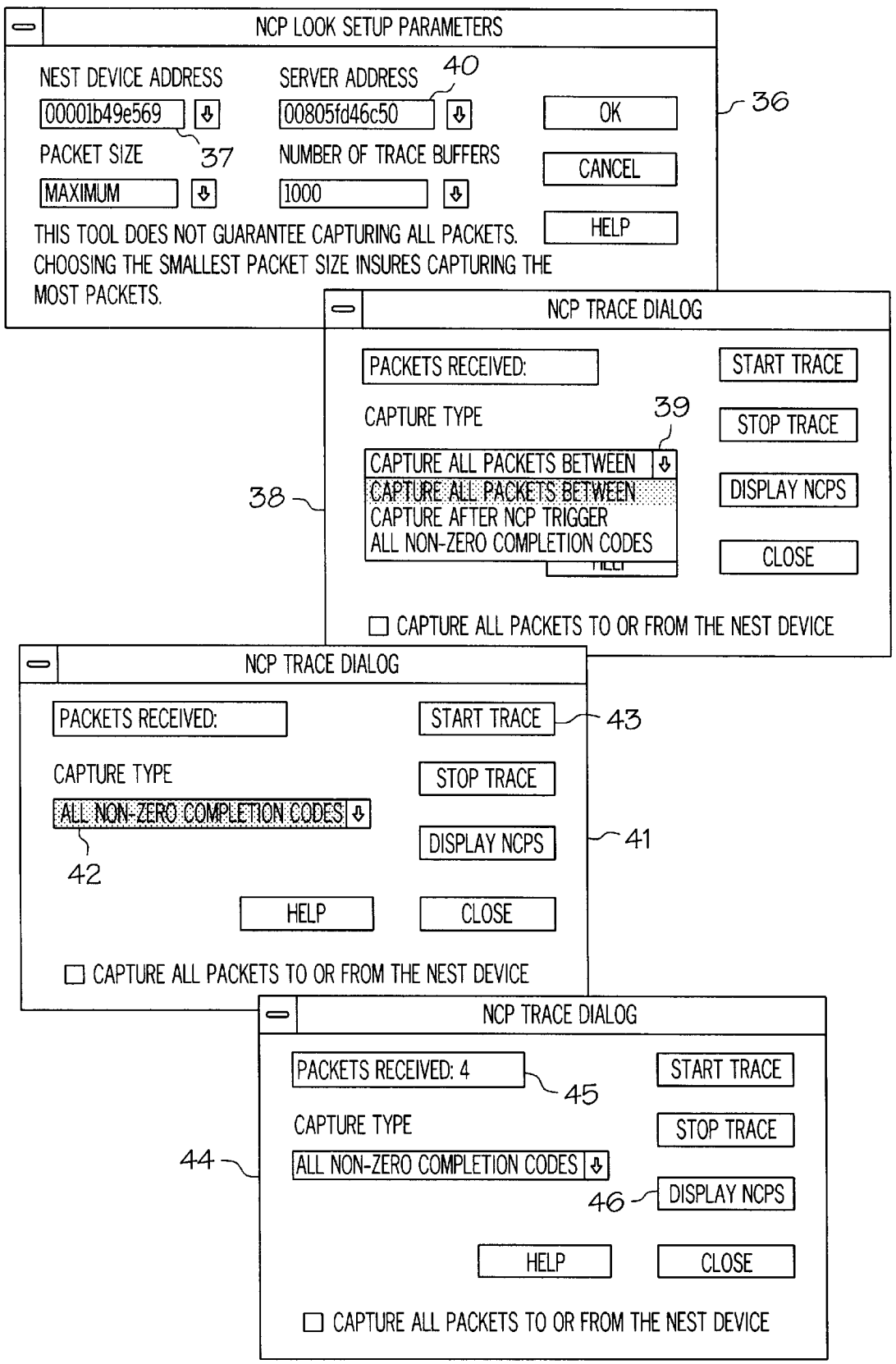
FIGS. 2 and 3 illustrate a sequence of windows for initiating a user-specified selection process according to one preferred embodiment of this invention.

FIG. 2 illustrates a series of windows which test tool 34 can utilize to allow for additional user selected criteria in determining which command and response packets are to be captured, to further reduce the number of irrelevant packets captured by test tool 34.

Test tool 34 can display window 36 for identification of the particular nodes of interest to be monitored. Field 37 allows entry of a first node which will communicate command packets over network 20, and field 40 allows entry of a second node which will receive the command packets and will communicate response packets in response to the command packets. The Media Access Control (MAC) layer address of each device can be entered into address fields 37 and 40, respectively, or any identifier known to the network which uniquely identifies a particular node could be used. For example, some network protocols include a table which contains a unique name and a corresponding MAC address for each device on the network. Given the name of the device, the table can be accessed to determine the particular MAC address for the device. Test tool 34 communicates the addresses of the selected nodes to packet prescan 31 which utilizes the addresses to filter out command and response packets which originated from nodes other than those selected in window 36. According to another preferred embodiment of this invention, the address of only one node is entered in window 36 and packet prescan 31 selects all command and response packets which have either a source or destination address which matches the entered address.

Test tool 34 can display window 3 8 to allow a user to specify a particular type of selection criteria to be applied to the command and response packets. For example, drop list button 39 can be actuated to allow a user to specify that the apparatus according to this invention should capture all command and response packets between the two preselected nodes (Capture All Packets Between), or that capturing of packets should occur after a particular event has occurred on the network (Capture After NCP Trigger), or that only command and response packets in which the response packet contains a nonzero completion code should be captured (All Non-Zero Completion Codes). As shown in field 42 of window 43, in this example the user has directed test tool 34 to capture all command and response packets in which the response packet contains a non-zero completion code. Under one particular command and response protocol, the Netware Core Protocol (NCP), a non-zero completion code indicates an error response packet. An error response packet is returned by node 25 when a command packet from node 24 can not be processed for some reason. Thus, the Non-Zero Completion Code option directs the method and apparatus according to this invention to select only those command and response packets in which a response packet contains an error response. A developer can use this option to isolate from a stream of packets communicated over network 20 only those command and response packets in which an error was reported, which greatly reduces the amount of time it takes to identify problems with command and response packets.

Figure 3:
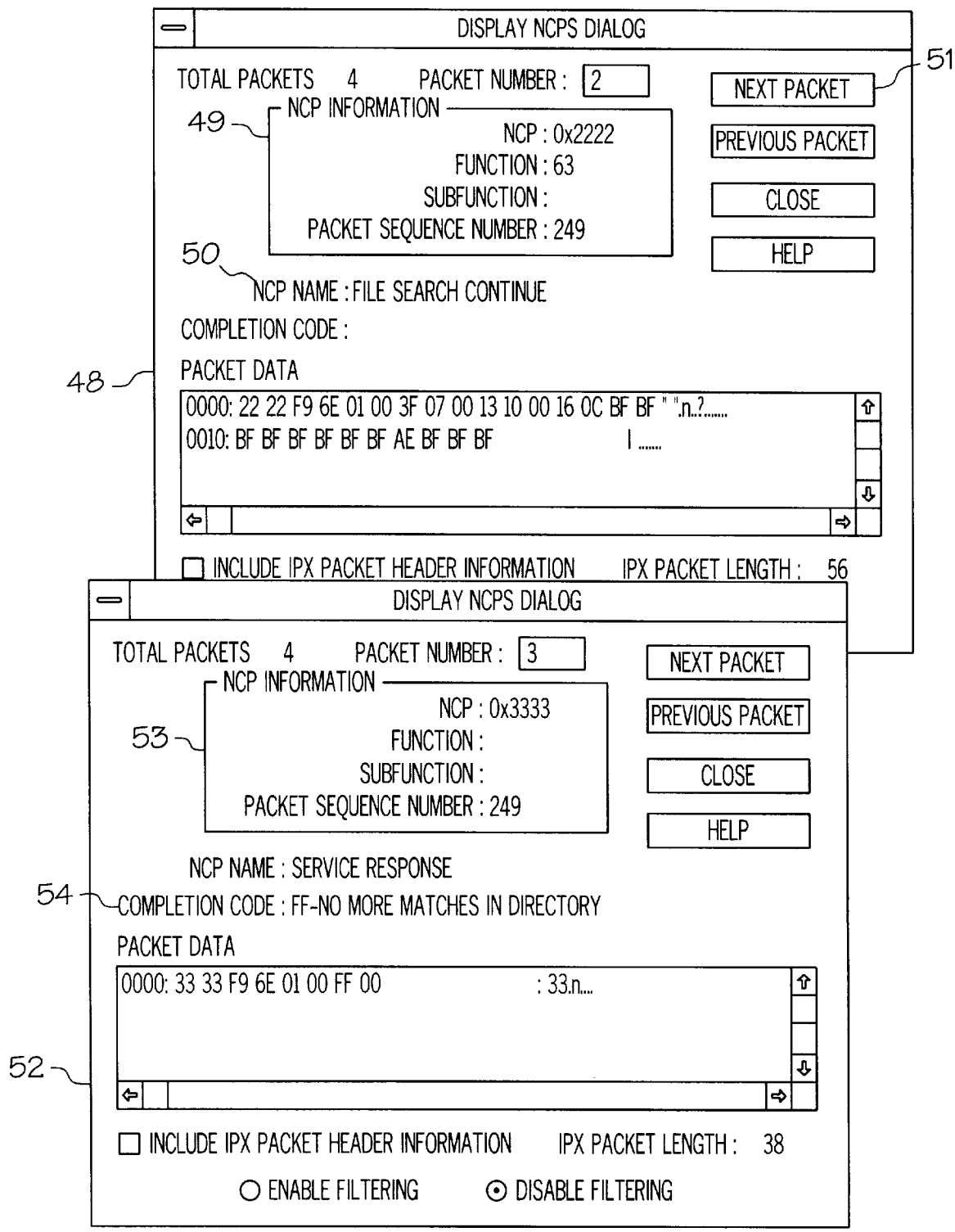

Upon actuation of start trace button 43, test tool 34 and packet prescan 31 in combination begin monitoring network 20 and selecting all command and response packets in which the response packet contains a non-zero completion code. As illustrated in packets received field 45 of window 44, the apparatus of this invention captured four packets from the stream of packets communicated over network 20. After capturing the appropriate command and response packets of interest, test tool 34 can display the captured packets in both a raw format and an interpreted format for analysis by the user. Window 48 of FIG. 3 illustrates such a display according to one preferred embodiment of this invention. Info box 49 indicates that an NCP type 0x2222 packet was captured which, in the NCP protocol, is a command packet. Info box 49 also indicates that an identifier associated with the command packet is Packet Sequence Number 249. NCP name field 50 indicates that the type of command packet was a File Search Continue command packet.

Upon actuation of next packet button 51, window 52 is displayed. Window 52 contains the corresponding response packet returned in response to the command packet shown in window 48. This can be verified by observing that the Packet Sequence Number in info box 53 matches the Packet Sequence Number in info box 49. Thus, test tool 34 can utilize the Packet Sequence Number field utilized in the NCP protocol to pair a particular command packet with its corresponding response packet. Such identifiers are used in other command and response protocols. Completion code field 54 indicates that an error code of 'FF' was returned in response to the command packet shown in window 48. As illustrated, test tool 34 extracted only the command and response packets in which the response packet contained an error code.

Figure 4:
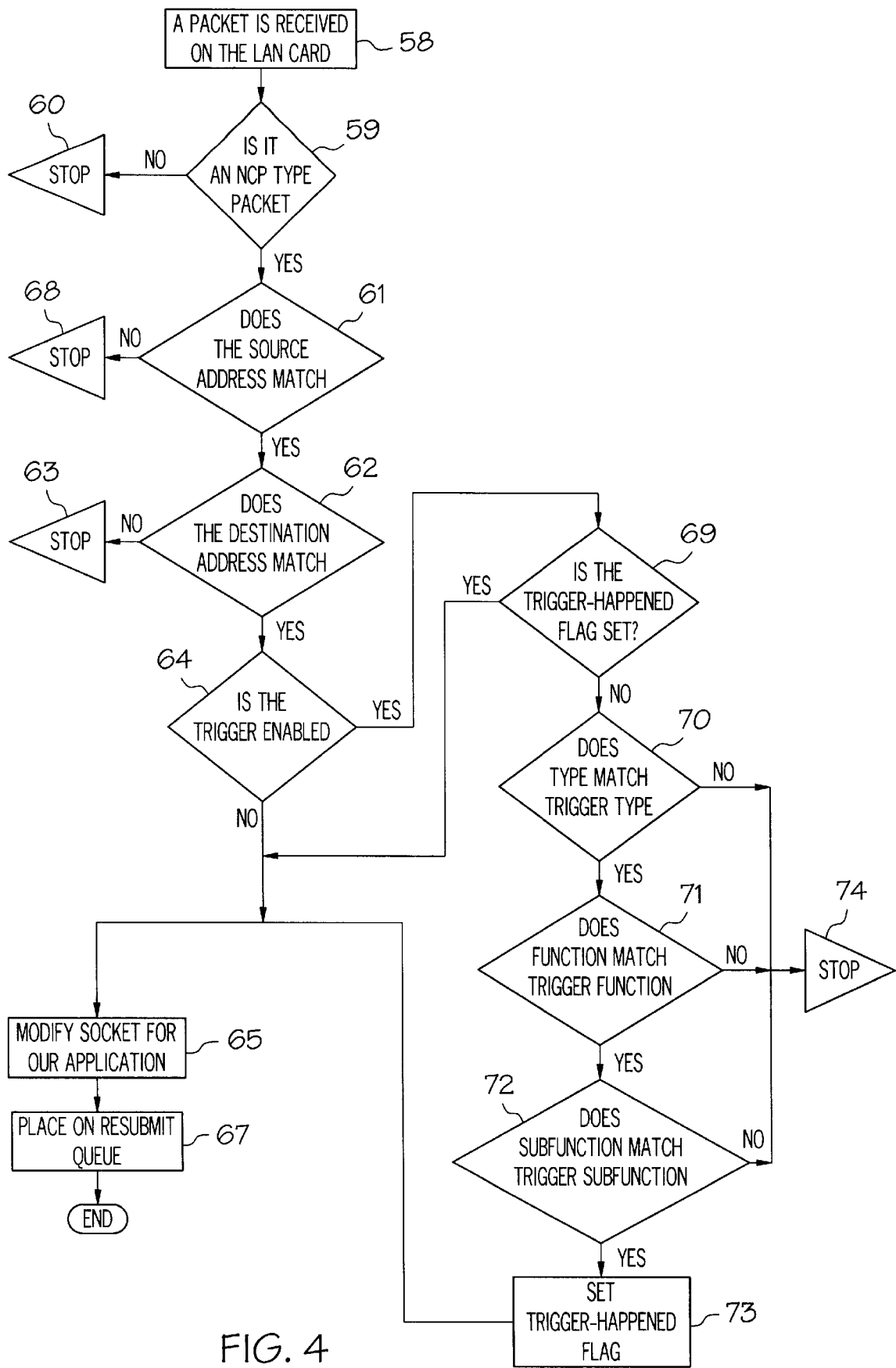
FIG. 4 is a flow diagram showing command and response packet selection according to one preferred embodiment of this invention.

FIG. 4 is a flow diagram illustrating the steps performed by packet prescan 31 according to one preferred embodiment of this invention. Network card 28 receives a packet from network 20 at block 58. At block 59, packet prescan 31 examines the packet and determines whether or not the packet is a command or response packet. This determination can be made by recognizing that certain command and response protocols require that packets have certain characteristics which differ from other types of packets, for example, a field in the header will contain a certain value. If the packet is not a command or response packet, packet prescan 31 stops it block 60 and awaits the next packet from network card 28. If the packet is a command or a response packet, at block 61 packet prescan 31 compares the source address within the header portion of the packet to the addresses of the nodes identified in address fields 37 and 40 of FIG. 2. If the source address of the packet does not match either of the addresses of the preselected nodes, then packet prescan 31 stops processing the packet at block 68. If the source address matches one of the preselected nodes, then the destination address in the header portion of the packet is compared to the address of the nodes identified in address fields 37 and 40 of FIG. 2. If this address does not match, then the packet is not relevant and packet prescan 31 stops at block 63.

If both the source address and the destination address of the packet match the addresses entered in address fields 37 and 40 of FIG. 2, then at block 64 packet prescan 31 determines whether or not a trigger has been selected by a user. A trigger identifies a particular predetermined characteristic of a packet that, when detected by packet prescan 31, indicates that selection of all command and response packets should begin. For example, a trigger may be a certain type of command packet. If a trigger has been selected by a user, then at block 69, packet prescan 31 determines whether the trigger has already been detected by checking a trigger-happened flag. If the trigger has already been detected, then the trigger-happened flag will be set and the steps required to pass the packet to test tool 34 begin at block 65. If the trigger-happened flag is not set, then at block 70 packet prescan 31 determines whether the command or response packet matches the particular trigger value.

According to one preferred embodiment of this Invention, the particular trigger value can comprise a certain type of command packet, and a user can select one or more trigger values. For example, a user can specify that triggering should occur only when a packet has the following predetermined characteristics: the packet must be a certain type of command packet, the command packet must contain a certain function value, and the packet must contain a certain subfunction value. It is apparent that the complexity of triggering allowed can vary greatly. The field layouts of the packets used in command and response protocols, and the values which such fields can contain, are well documented and available to those skilled in this art. Thus, at block 70, packet prescan 31 can extract from the captured packet its command type. If the command type of the packet matches the preselected trigger value, then at block 71 it is determined if a particular function was also selected as a trigger. If so, packet prescan 31 determines whether the function type of the packet matches the trigger function value selected. If it does, at block 72, packet prescan 31 determines whether a subfunction has been selected by the user and, if so, determines whether the packet subfunction value matches the trigger subfunction value. If either of the matches at blocks 70, 71 or 72 fail, then packet prescan 31 stops at block 74, and the trigger-happened flag is not set. If all matches at blocks 70, 71 and 72 are successful, then at block 73 packet prescan 31 sets the trigger-happened flag and all subsequently captured command and response packets which contain the appropriate addresses will be passed to test tool 34 for further analysis.

At block 65 packet prescan 31 begins the modification process which may be necessary to communicate the packet to test tool 34. Packet prescan 31 modifies the socket in the packet header to match the socket of test tool 34. At block 67, packet prescan 31 resubmits the packet to LSL 29 for submission to IPX 32, which in turn will pass the packet to test tool 34.

Figure 5:
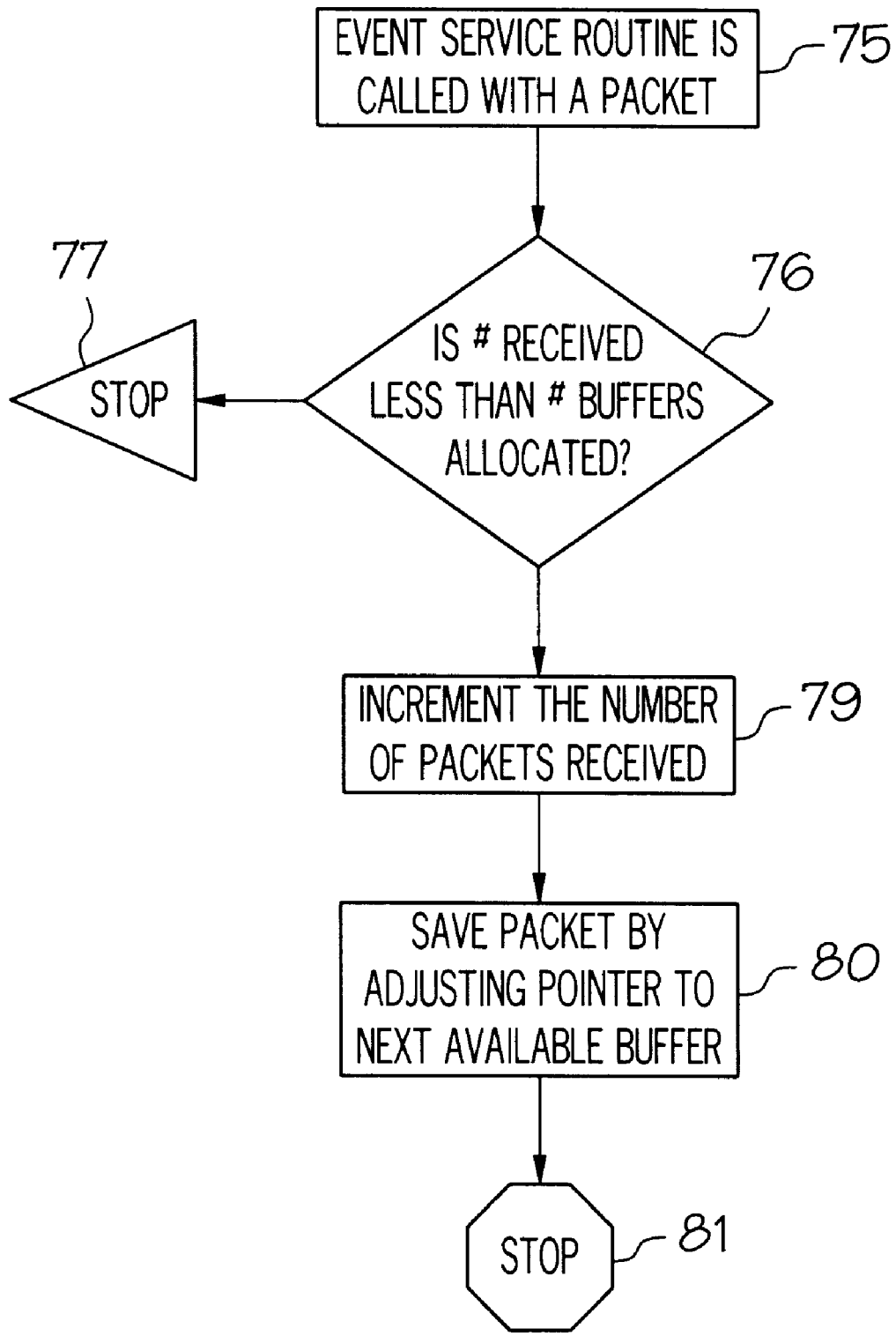
FIG. 5 is a flow diagram showing additional processing of command and response packets in conjunction with the process shown in FIG. 4.

FIG. 5 is a flow diagram which illustrates steps taken by test tool 34 according to one preferred embodiment of this invention. At block 75, test tool 34 is passed a packet from IPX 32. At block 76, test tool 34 determines if an empty buffer exists for storage of the packet. If not, test tool 34 stops at block 77. If an empty buffer for storage of the packet exists, at block 79 a counter identifying the number of packets received is incremented by one, and at block 80 the packet is saved by adjusting the pointer to the next available buffer. Test tool 34 then awaits the next packet at block 75.

Figure 6:
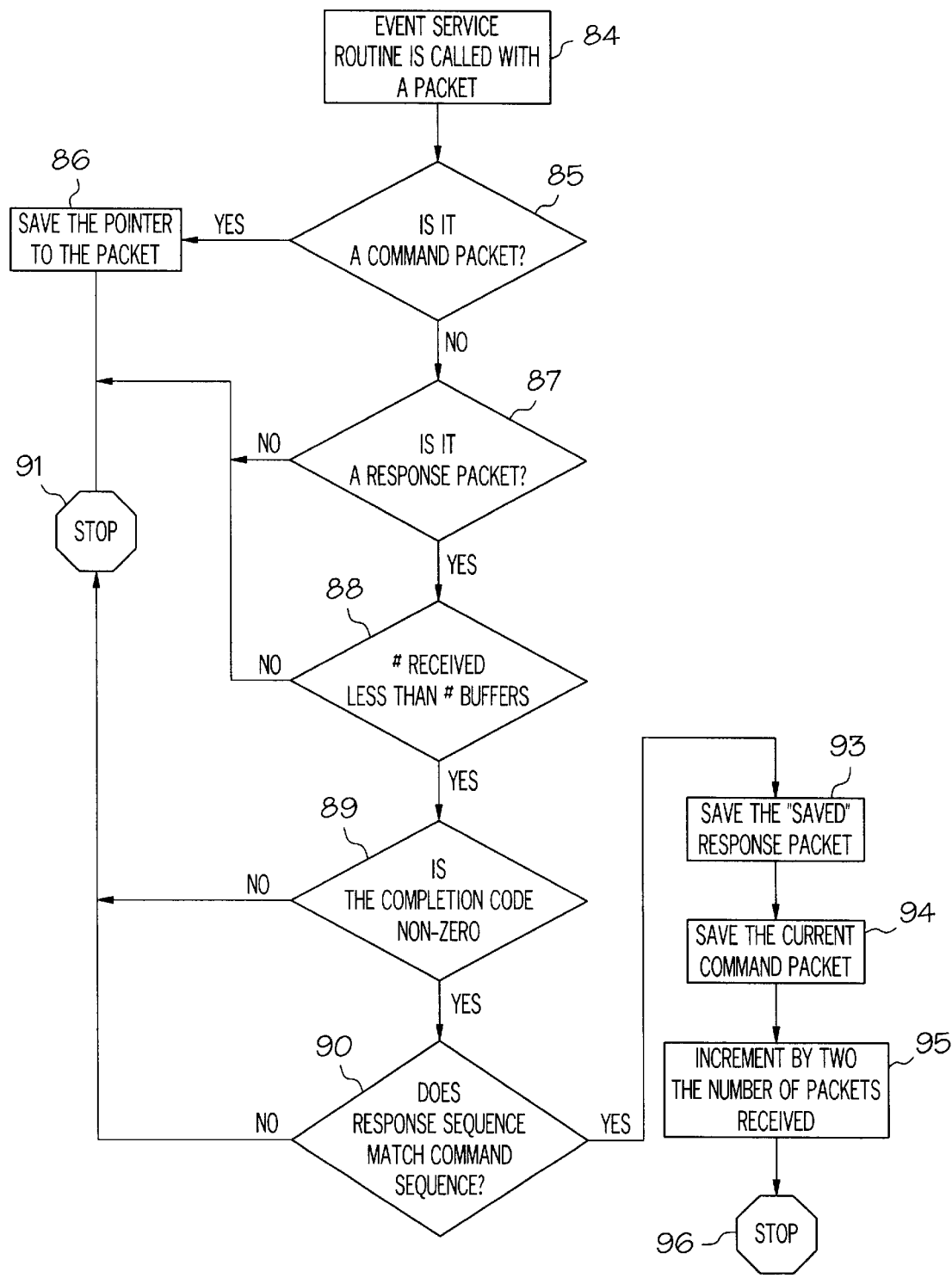
FIG. 6 is a flow diagram showing command and response packet selection according to another preferred embodiment of this invention.

FIG. 6 illustrates a process of test tool 34 for selecting and preserving all command and corresponding response packets in which the response packet contains a non-zero completion code, in an environment in which corresponding command and response packets are communicated over network 20 consecutively. At block 84, test tool 34 is passed a packet. At block 85, it is determined whether the packet is a command packet. If it is, then at block 86, a pointer to the packet is saved and test tool 34 stops and awaits reception of the next packet. If at block 85 it is determined that the packet is not a command packet, then at block 87 it is determined whether the packet is a response packet. If it is not a response packet, then test tool 34 slops and awaits another packet. If the packet is a response packet, then at block 88 it is determined whether there is a storage buffer available for the packet. If there is a storage buffer available, then at block 89 test tool 34 extracts from the response packet the value of the completion code field. If the completion code field contains a non-zero value, then test tool 34 extracts from the response packet an identifier and compares the identifier to the previously saved command packet. Upon matching the identifier from the response packet with a command packet having the same identifier, and thus ensuring that the command packet and response packet correspond to one another, at blocks 93 and 94 the response packet and corresponding command packet are saved. At 95, test tool 34 increments by two the counter containing the number of packets received and at block 96 stops and awaits the next packet.

Figure 7:
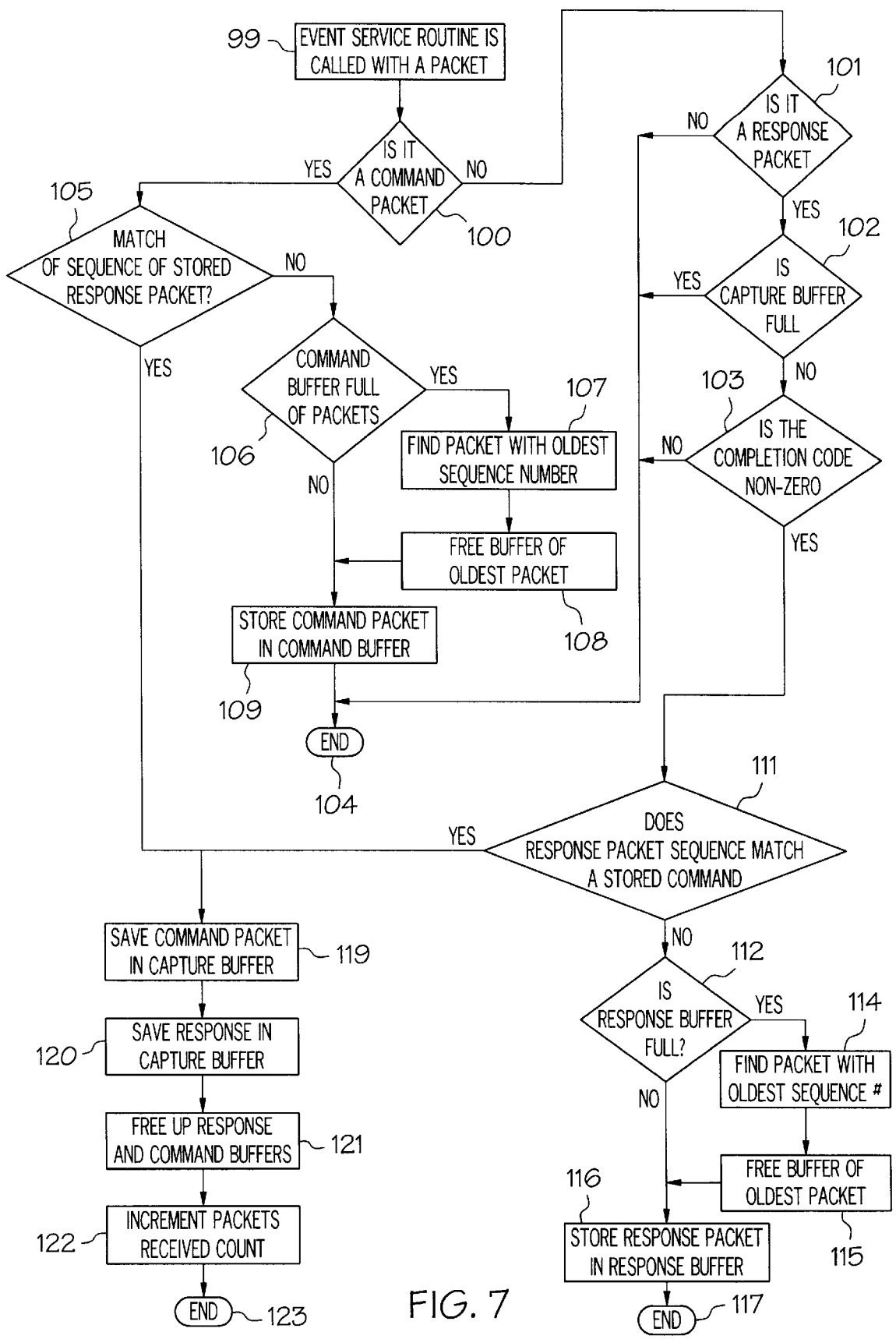
FIG. 7 is a flow diagram showing command and response packet selection according to another preferred embodiment of this invention.

FIG. 7 is a flow diagram illustrating a process by which test tool 34 selects and preserves corresponding command and response packets which are not necessarily communicated over network 20 consecutively. At block 99 test tool 34 is passed a packet. At block 100 it is determined whether the packet is a command packet, and if so, at block 105 an identifier is extracted from the command packet and a group of response buffers containing previously captured response packets are searched for a response packet having the same identifier. If no response packet matches the identifier, then no response packet corresponding to the command packet has been received. At block 106 it is determined whether empty command buffers exist for storage of the command packet. If no empty command buffers exist, at block 107 it is determined which command buffer contains the oldest command packet and at block 108 the oldest command buffer is freed. At block 109 the command packet is stored in an available command buffer and test tool 34 stops at block 104 to await another packet.

If at block 100 the packet is not a command packet, it is determined at block 101 if the packet is a response packet. If it is not a response packet, test tool 34 stops at block 104 and awaits arrival of another packet. If it is a response packet, at block 102 it is determined whether any remaining capture buffers for storage of the response packet exist. If not, test tool 34 stops at block 104. If remaining capture buffers exist, at block 103 the response packet is analyzed to determine if the response packet contains a non-zero completion code. If the completion code is non-zero, control continues to block 111 where an identifier is extracted from the response packet and the buffers of previously stored command packets are examined for a command packet having the same identifier. If no command packet is found which matches the response packet, at block 112 it is determined whether the response packet buffer is full. If it is full, at block 114 and 115 the oldest response packet in the buffers is found and discarded and at block 116 the response packet is stored in a response buffer, and test tool 34 stops at block 117 and awaits another packet.

If at either of blocks 105 or 111 a pair of corresponding command and response packets is located, then at block 119 the command packet is stored in the capture buffer and at block 120 the response packet is stored in the capture buffer. At block 121 the buffers utilized to store the command and response packets saved at blocks 109 and 116 are freed for subsequent use. At block 122 a packet counter maintaining a counter of packets captured is incremented by two. Test tool 34 stops at block 123 and awaits arrival of another packet.

While FIGS. 4, 5, 6 and 7 illustrate a certain division of processing between packet prescan 31 and test tool 34, it is apparent that other divisions of processing are possible. For example, test tool 34 could be utilized primarily for obtaining the appropriate selection criteria from the user, such as selecting only those command and response packets in which the response packet contains a non-zero completion code, and then could pass this criteria to packet prescan 31, which could then analyze each packet and select only those command and response packets in which the response packet contains a non-zero completion code, and preserve those packets in a buffer. After the tracing is completed, packet prescan 31 could pass a pointer to the buffer containing the preserved packets to test tool 34, which could then display the packets to a user. Such method would eliminate the need to modify each packet for passing through the IPX stack to test tool 34.

According to another preferred embodiment of this invention, test tool 34 can process a previously captured collection of packets and display to a user only command and response packets of interest. This process is generally referred to in the art as filtering. Filtering allows a user to indicate to test tool 34 that all packets which contain one or more predetermined characteristics should be displayed, and that all other packets should be ignored. The method and apparatus of this invention allow a user to specify one or more types of command and response packets to display, and allow a user to select specific completion codes of those types to exclude. Thus, this invention can allow a user to select from a large quantity of packets communicated over network 20 only a select few command and response packets of interest.

Figure 8B:
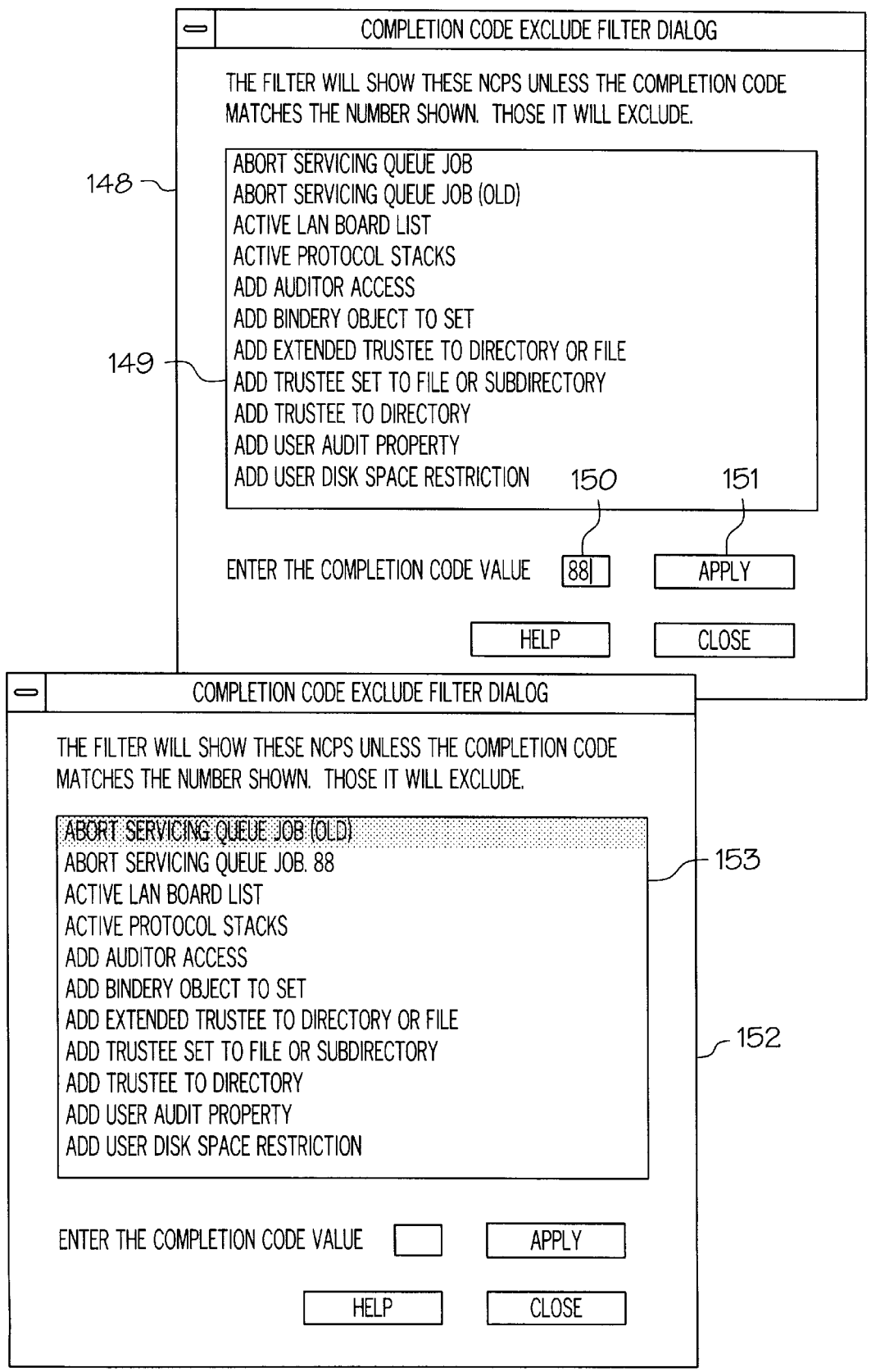
FIG. 8 illustrates a sequence of windows by which a user can select predetermined criteria upon which certain command and response packets can be selected.

An example of the selection criteria used by test tool 34 for filtering packets according to one preferred embodiment of this invention is illustrated in FIG. 8. Test tool 34 can display window 142 which presents box 143 which contains a list of one or more types of command packets that can be selected by a user, In the example shown in FIG. 8, the particular command and response protocol used is the NetWare Core Protocol, however, it is apparent to those skilled in the art that any command and response protocol could be utilized and box 143 would contain the relevant types of command packets for the particular command and response protocol of interest. A user can highlight the particular command types of interest in box 143 and actuate button 144 to add the command packet types of interest to box 145. Box 145 contains the types of command packets which will be displayed, while all other packet types will be excluded. A user can further narrow the types of packets displayed from those shown in box 145 by requesting that test tool 34 not display packets in which the response packet contains a certain completion code. The selection is enabled by actuation of button 147. Upon actuation of button 147 window 148 is displayed which contains box 149 showing a list of all command packet types that the user selected in block 145 of window 142. A user can highlight a particular command packet type, for example as shown in window 148 the 'Abort Servicing Queue Job' type, and in field 150 enter a completion code for this command packet type which will not be displayed. In this example, the user has entered the completion code value 88 in field 150 and actuated button 151 to apply the completion code to the command packet type.

Window 152 illustrates how the packet type 'Abort Servicing Queue Job' now contains the value 88 to illustrate that all Abort Servicing Queue Job command packet types will be displayed unless the completion code of the corresponding response packet contains a value of 88. Thus, prior to displaying either a command or a response packet of type Abort Servicing Queue Job, the response packet will be examined to determine whether it contains a completion code of 88.

Figure 9:
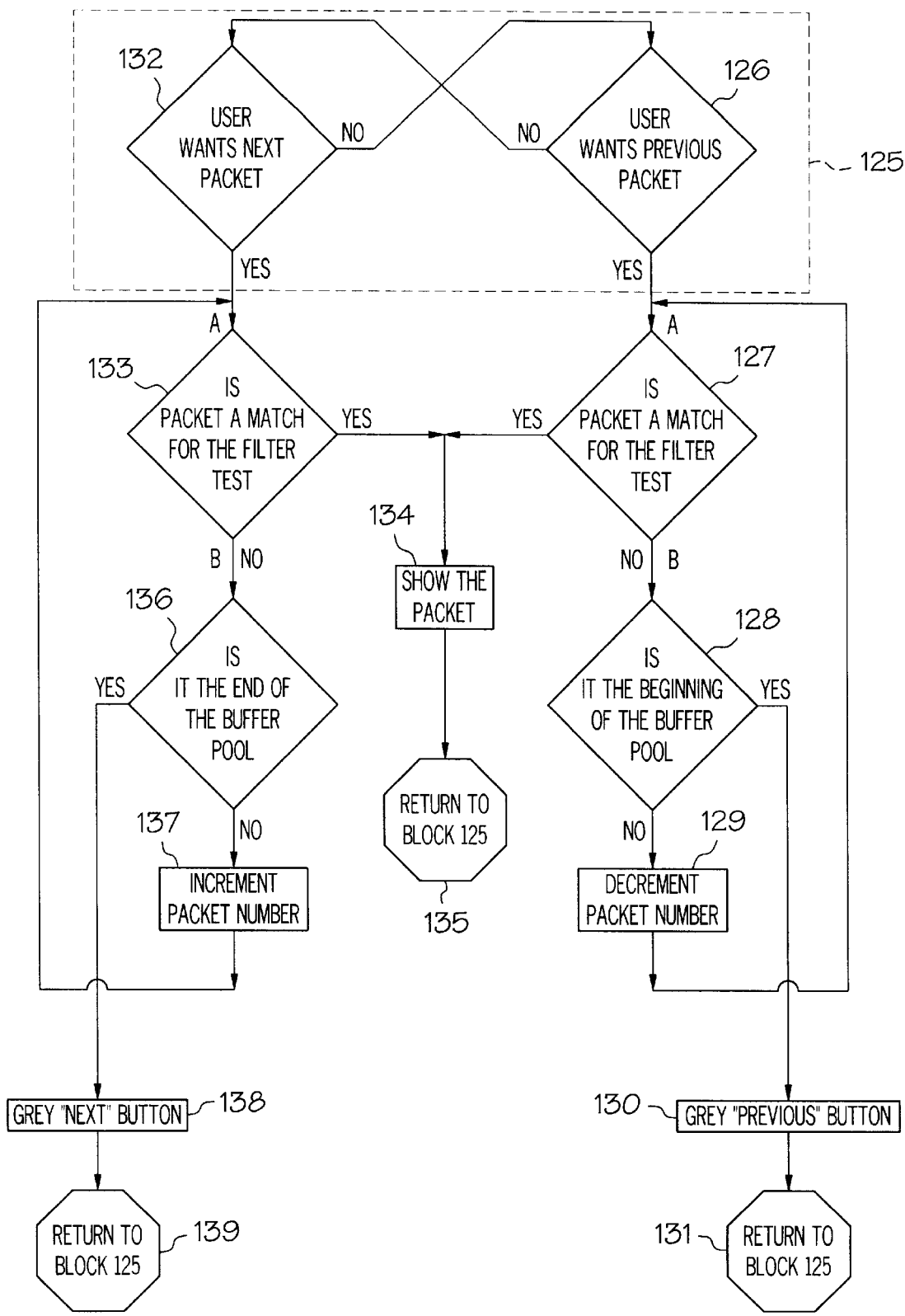
FIG. 9 is a flow diagram showing a filtering process according to one preferred embodiment of this invention.

FIG. 9 illustrates steps of test tool 34 for carrying out the filtering process according to one preferred embodiment of this invention. FIG. 9 assumes that the collection or trace of command and response packets has been ordered in a chronological command and response packet order. Test tool 34 presents a series of buttons to the user which allows the user to request a next packet or a previous packet and awaits the user's response at input block 125. If a user indicates that she wishes to see the previous packet, then at block 127 the previous packet is analyzed to determine whether the packet should be filtered out or displayed. If the packet should be displayed then at block 134 test tool 34 displays the packet and at block 135 returns to input block 125 awaiting the user's next request. If at block 127 the packet selected was filtered out, then at block 128 it is determined whether the packet selected is the beginning packet in the buffer pool, and if it is then the button which allows the user to select the previous packet is deactivated, and thus the user can only select the next packet. If at block 128 test tool 34 is not at the beginning of the buffer pool, then at block 129 the packet number counter is decremented and control returns to input block 127 where another packet is selected. This loop through blocks 127–129 continues until either the last packet is encountered or until a packet is selected which is not filtered out and which is thus displayed at block 134. If the user requests test tool 34 to select the next packet at block 132, then a similar series of processing occurs at blocks 133, 136 and 137 regarding whether the packet matches the filter and whether additional packets remain to be shown to the user. In this way a user can chronologically traverse from the beginning to the end of a trace having only those particular command and response packets of interest displayed by test tool 34.

Figure 10:
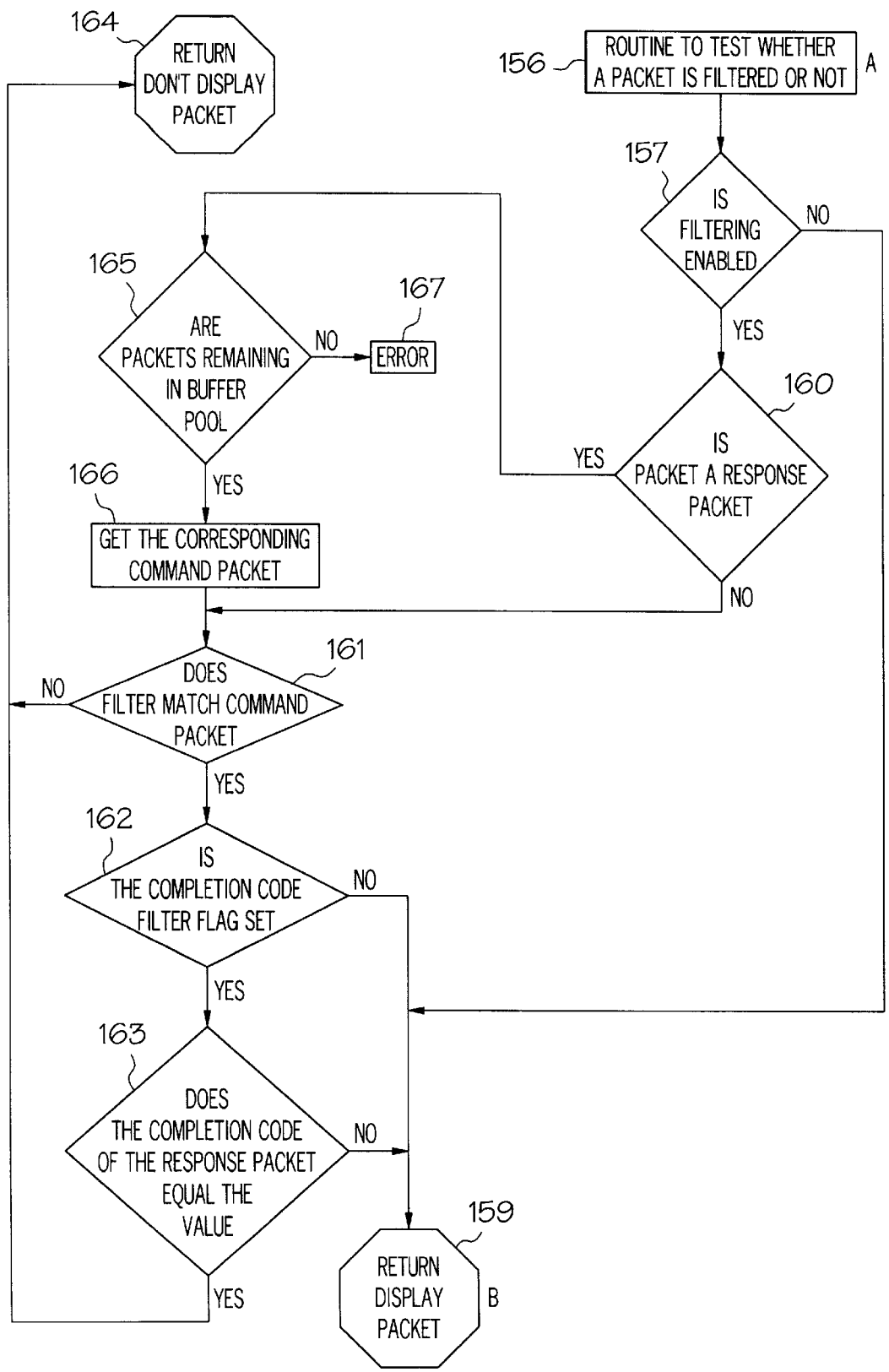
FIG. 10 is a flow diagram showing in more detail the filtering process referred to in FIG. 9.

Filtering of the packets which is represented at blocks 127 and 133 can be achieved according to one preferred embodiment of this invention as illustrated in the flow diagram of FIG. 10. The letters A and B represented at the top and bottom of FIG. 10 represent the process occurring between the letters A and B represented at blocks 127 and 133 of FIG. 9. As shown in FIG. 10, at block 157 it is determined whether filtering has been enabled by a user, or if test tool 34 should display all command and response packets in the trace. If filtering has not been enabled, then at block 159 it is indicated that the packet should be displayed. If at block 157 it is determined that filtering has been enabled, then at block 160 test tool 34 examines the packet to determine if it is a response packet. If it is a response packet then at block 165 it is determined if additional previous packets exist. If no previous packets exist, then the response packet has no corresponding command packet and an error is returned at block 167. If a previous packet does exist, then at block 166 the previous packet is obtained. According to the embodiment of test tool 34 illustrated in FIGS. 9 and 10, the trace of packets is in chronological command packet and response packet order. Thus, the previous packet obtained at block 166 will be the command packet which corresponds to the response packet. Blocks 161, 162 and 163 are repeatedly processed for each type of command packet type requested by a user to be displayed until it is determined either that the packet should be displayed, or that the packet should be filtered out. At block 161 the field from the command packet identifying the command packet type is compared to the command packet type requested by the user to be displayed. If it matches one of the command packet types selected by the user, then at block 162 it is determined whether the user has requested that only packets of this command packet type in which the corresponding response packet contains a certain completion code should be displayed. If not, then at block 159 the packet is displayed. If the user has requested that only command packet types in which the corresponding response packet contains certain completion codes should be displayed, then at block 163 the completion code from the corresponding response packet is examined. If the completion code from the response packet matches the completion code which the user indicated should not be displayed, then at block 164 the packet is not displayed, otherwise at block 159 the packet is displayed.

Thus, test tool 34 according to this invention can analyze predetermined characteristics from both a command packet and corresponding response packet to determine whether or not a particular command packet or response packet should be displayed to the user. This ability to display a packet in a trace only as a function of values from two separate packets in the trace greatly enhances the ability of a user to select only certain packets of interest and greatly reduces the amount of time required to debug a command and response protocol. It is apparent to those skilled in the art that the method illustrated in FIG. 10 is only one method which can be utilized to carry out a filtering process according to this invention and that other obvious deviations are possible, and in fact may be required depending on the particular command and response protocol being analyzed.

Figure 11:
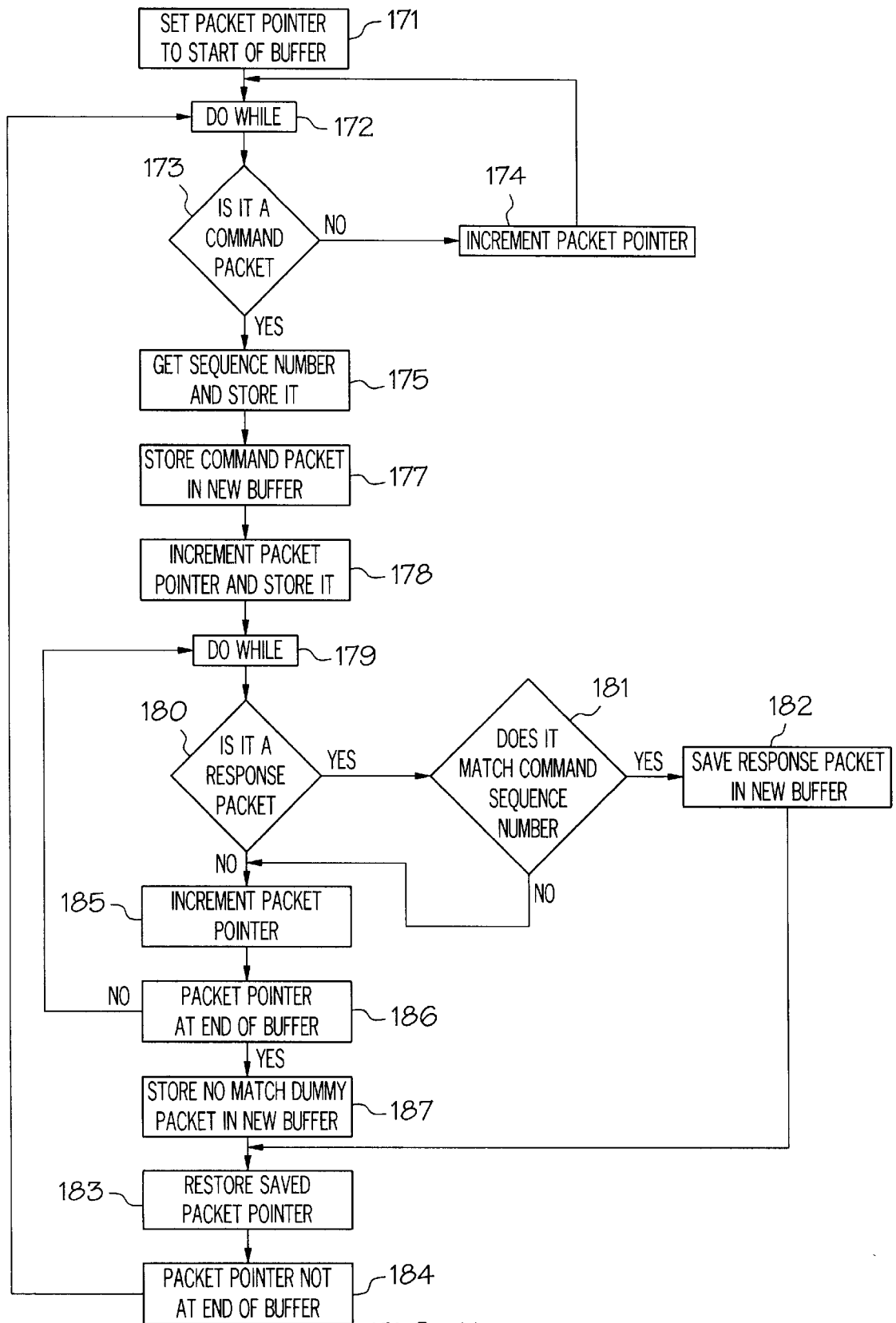
FIG. 11 is a flow diagram showing a process for reordering a collection of packets into an ordered trace of command and response packets, according to one preferred embodiment of this invention.

When carrying out the filtering process according to one preferred embodiment of this invention, test tool 34 presumes that the collection of command and response packets is in a chronological command and response packet order. Such ordering can exist either because the particular command and response protocol requires that command and response packets be communicated over network 20 in a chronological order, and thus during the tracing of the command and response packets such ordering is guaranteed, or such chronological ordering can occur prior to test tool 34 selectively filtering out command and response packets. One process for reordering a collection of command and response packets which are not necessarily in chronological order is illustrated in FIG. 11. FIG. 11 illustrates how test tool 34 can process a collection of randomly ordered command and response packets and generate a chronologically ordered trace of command and response packets. At block 171 test tool 34 sets a packet pointer to the beginning of the buffer containing the out-of-order command and response packets. At block 172 test tool 34 initiates a loop. At block 173 test tool 34 analyzes the packet and determines whether the packet is a command packet. If the packet is not a command packet, then at block 174 the packet pointer is incremented and control returns again to blocks 172 and 173 where the next packet is similarly analyzed. In this way, test tool 34 initially traverses the collection of packets until a command packet is located. When a command packet is located, at block 175 the identifier, or sequence number, of the command packet is extracted and stored in a memory and at block 177 the command packet is stored in a buffer. At block 178 the packet pointer is incremented and saved in a memory. At block 179 a loop begins wherein at blocks 180, 181, 185 and 186, each packet in the collection of randomly ordered command and response packets is examined until a response packet having the same identifier as that of the command packet is located. If all packets in the collection are traversed without locating the corresponding response packet, then at block 187 a 'dummy' packet is stored to represent that no response packet exists for this command packet. At block 183 the previously saved pointer from block 178 is restored and at block 184 it is determined whether all of the packets have been analyzed. If packets remain to be extracted from the collection of packets, then control returns to block 172 where the process is repeated. If at block 181 it was determined that an identifier from the response packet matched an identifier from the command packet, then the response packet is saved chronologically adjacent the previously saved command packet and the steps at blocks 183 and 184 are carried out as previously explained.

Figure 12:
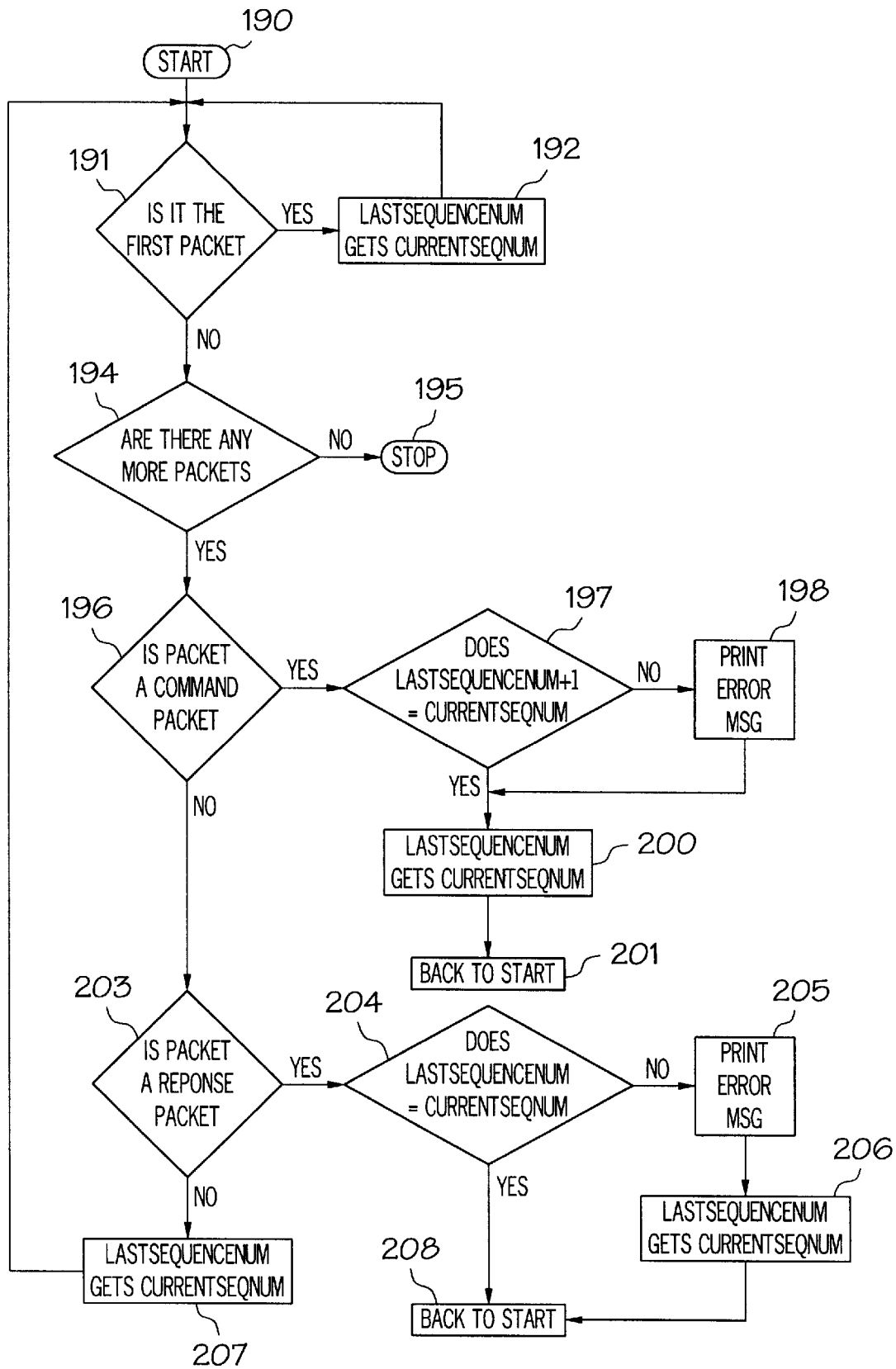
FIG. 12 is a flow diagram showing a process for identifying out-of-order sequence numbers according to another preferred embodiment of this invention.

According to another preferred embodiment of this invention, test tool 34 can analyze a preordered collection of command and response packets and identify and report all out-of-sequence conditions within the collection of packets. The collection of packets can be preordered by a method such as is disclosed in FIG. 11. As shown in FIG. 12, at block 191, upon selecting the first packet test tool 34 stores the current sequence number from the first packet into the LastSequenceNum variable, and then returns to block 191 to select another packet. At block 194, test tool 34 determines if any more packets are left in the trace. If not, test tool 34 stops at block 195. If additional packets exist, at block 196 the packet is analyzed to determine if it is a command packet. If it is, then at block 197 test tool 34 determines if the sequence number of the command packet is one greater than the LastSequenceNum variable, since the sequence number of the command packet should be one greater than the previously saved last sequence number. If the sequence number of the command packet is not one greater than the previously saved sequence number, then an out-of-sequence condition exists and an error message is generated at block 198. If the sequence number of the command packet is one greater than the previously saved sequence number, then no error exists, and the variable LastSequenceNum is set to the sequence number of the command packet, and control returns to block 191 where another packet from the trace is selected.

If at block 196 the packet was not a command packet, then at block 203 test tool 34 determines if the packet is a response packet. If it is not, then at block 207 the LastSequenceNum variable is set to the current sequence number and another packet is selected at block 191. If at block 203 it is determined that the packet is a response packet, then at block 204 it is determined if the previously saved sequence number is equal to the sequence number of the response packet. If it is not, an error exists as the sequence number of the response packet does not match that of the most recent command packet. An error is generated at block 205, the variable LastSequenceNum is set to the value of the sequence number from the response packet, and control returns to block 191 where another packet is selected. If the sequence number of the response packet matches that of the previously saved sequence number, then no error exists and control returns to block 191.

The foregoing description of preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A method for selecting a command packet and a corresponding response packet from a communication stream of packets sent between different nodes on a network, the method comprising the steps of:

(a) monitoring the communication stream;

(b) dynamically recognizing a first node command packet sent from a first node to a second node while monitoring the communication stream;

(c) dynamically determining whether a packet sent from the second node to the first node is a response packet sent in response to the command packet; and (d) if the packet sent from the second node to the first node is the response packet sent in response to the command packet, preserving the command packet and the response packet.

2. A method according to claim 1, wherein if the packet sent from the second node to the first node is the response packet sent in response to the command packet, dynamically recognizing a service completion code in the response packet, and preserving the command packet and the response packet only if the service completion code has a first predetermined characteristic.

3. A method according to claim 2 wherein having the first predetermined characteristic comprises a field of the response packet having a first predetermined value.

4. A method according to claim 3, wherein the first predetermined value is a user-selected value.

5. A method according to claim 3, wherein the first predetermined value comprises any non-zero value.

6. A method according to claim 1, further comprising performing steps (b) through (d) only after one of a command packet and a response packet contains a predetermined trigger value.

7. A method according to claim 6, wherein the predetermined trigger value is a user-selected value.

8. A method according to claim 1, further comprising performing steps (b) through (d) for a predetermined number of packets.

9. A method according to claim 1, further comprising performing steps (b) through (d) for a predetermined amount of time.

10. A method according to claim 1 wherein the dynamically determining step comprises comparing a first identifier from the command packet with a second identifier from the response packet, wherein if the first identifier matches the second identifier the response packet is determined to be sent in response to the command packet.

11. A method according to claim 1, wherein the dynamically recognizing step further comprises determining if the first node command packet is a predetermined type of command packet, and selecting the command packet only if the command packet is the predetermined type.

12. A method according to claim 1, further comprising displaying the preserved command packet and the preserved response packet.

13. A method for selecting command and response packets from a trace having a plurality of command packets and corresponding response packets, comprising the steps of:

(a) displaying a plurality of user selectable predetermined characteristics and obtaining a user-selected first predetermined characteristic of a command packet to select;

(b) locating a packet in the trace;

(c) determining if the packet is either a command packet or a response packet;

(d) if a command packet is located, determining if the command packet has the first predetermined characteristic and if so then selecting the command packet, and if a response packet is located, determining if the command packet corresponding to the response packet has the first predetermined characteristic, and if so then selecting the response packet.

14. A method according to claim 13, wherein the step of selecting the command packet further comprises determining if the response packet corresponding to the command packet has a second predetermined characteristic and if so then selecting the command packet.

15. A method according to claim 14, wherein the trace is ordered in a predetermined order by scanning through a collection of packets until a command packet is located, extracting from the command packet an identifier identifying a corresponding response packet, scanning the collection of packets until the corresponding response packet is located which contains the identifier, and storing the command packet and the response packet to the trace, whereby the command packet and the response packet can be accessed sequentially.

16. A method according to claim 15, wherein the process is repeated for each command packet in the collection of packets.

17. A method according to claim 13, wherein the step of selecting the response packet further comprises determining if the response packet has a second predetermined characteristic and if so then selecting the response packet.

18. A method according to claim 13, further comprising ordering the trace in a predetermined order prior to analyzing the trace.

19. A system for selecting a command packet and a corresponding response packet from a communication stream of packets sent between different nodes on a network, comprising:

(a) means for monitoring the communication stream;

(b) means for dynamically recognizing a first node command packet sent from a first node to a second node while monitoring the communication stream;

(c) means for dynamically determining whether a packet sent from the second node to the first node is a response packet sent in response to the command packet; and (d) if the packet sent from the second node to the first node is the response packet sent in response to the command packet, means for preserving the command packet and the response packet.

20. A system for selecting command and response packets from a trace having a plurality of command packets and corresponding response packets, comprising:

(a) means for displaying a plurality of user selectable predetermined characteristics and obtaining a user-selected first predetermined characteristic of a command packet to select;

(b) means for locating a packet in the trace;

(c) means for determining if the packet is either a command packet or a response packet;

(d) if a command packet is located, means for determining if the command packet has the first predetermined characteristic and if so then selecting the command packet, and if a response packet is located, means for determining if the command packet corresponding to the response packet has the first predetermined characteristic, and if so then selecting the response packet.

* * * * *